US012786832B2

(12) United States Patent
Alwar et al.

(10) Patent No.: US 12,786,832 B2
(45) Date of Patent: Nov. 3, 2026

(54) NETWORK ENERGY SAVING MODE ENHANCEMENTS

(71) Applicant: Nokia Technologies Oy, Espoo (FI)

(72) Inventors: Ethiraj Alwar, Bangalore (IN); Anna Pantelidou, Antony (FR)

(73) Assignee: Nokia Technologies Oy, Espoo (FI)

( * ) Notice: Subject to any disclaimer, the term of this patent is extended or adjusted under 35 U.S.C. 154(b) by 712 days.

(21) Appl. No.: 18/366,289

(22) Filed: Aug. 7, 2023

(65) Prior Publication Data

US 2024/0049089 A1 Feb. 8, 2024

(30) Foreign Application Priority Data

Aug. 8, 2022 (FI) ..................................... 20225707

(51) Int. Cl.
*H04W 36/16* (2009.01)
*H04W 36/00* (2009.01)

(52) U.S. Cl.
CPC ..... *H04W 36/165* (2013.01); *H04W 36/0085* (2018.08)

(58) Field of Classification Search
CPC ........... H04W 36/165; H04W 36/0085; H04W 52/0206
See application file for complete search history.

(56) References Cited

U.S. PATENT DOCUMENTS

2012/0329471 A1 12/2012 Barta et al.
2023/0138190 A1* 5/2023 Zhang ............... H04W 52/0206 370/311
2023/0284065 A1* 9/2023 Zhou ...................... H04B 17/30 370/252

FOREIGN PATENT DOCUMENTS

| | | | |
|---|---|---|---|
| CN | 114071661 | A | 2/2022 |
| EP | 3962153 | A1 | 3/2022 |
| WO | 2022/052059 | A1 | 3/2022 |

OTHER PUBLICATIONS

3rd Generation Partnership Project; Technical Specification Group Radio Access Network: Evolved Universal Terrestrial Radio Access (E-UTRA) and NR; Study on enhancement for Data Collection for NR and EN-DC ( Release 17), 3GPP TR 37.817, V17.0.0, Apr. 2022 (Year: 2022).*
Office action received for corresponding European Patent Application No. 23186883.7, dated Mar. 14, 2025, 5 pages.
"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.
"3rd Generation Partnership Project; Technical Specification Group Radio Access Network; NG-RAN; Xn application protocol (XnAP) (Release 16)", 3GPP TS 38.423, V16.8.0, Dec. 2021, pp. 1-467.
"Revised SID: Study on enhancement for data collection for NR and ENDC", 3GPP TSG RAN Meeting #89e, RP-201620, Agenda: 9.7.13, CMCC, Sep. 14-18, 2020, 4 pages.

(Continued)

*Primary Examiner* — Siming Liu
(74) *Attorney, Agent, or Firm* — Nokia Technologies Oy

(57) ABSTRACT

According to an aspect, there is provided an apparatus comprising a data collection configuration for carrying out data collection measurements for training an artificial intelligence or machine learning model used in controlling a mode change in a first radio cell to an energy saving mode.

14 Claims, 10 Drawing Sheets

(56) References Cited

OTHER PUBLICATIONS

"New WI: Artificial Intelligence (AI)/Machine Learning (ML) for NG-RAN", 3GPP TSG RAN Meeting #94e, RP-213602, Agenda: 8.6.3, CMCC, Dec. 6-17, 2021, 4 pages.
"3rd Generation Partnership Project; Technical Specification Group Radio Access Network; NR; NR and NG-RAN Overall Description; Stage 2 (Release 16)", 3GPP TS 38.300, V16.8.0, Dec. 2021, pp. 1-152.
"3rd Generation Partnership Project; Technical Specification Group Radio Access Network; NR; Multiplexing and channel coding (Release 17)", 3GPP TS 38.212, V17.0.0, Dec. 2021, pp. 1-190.
"3rd Generation Partnership Project; Technical Specification Group Radio Access Network; LTE Positioning Protocol (LPP) (Release 16)", 3GPP TS 37.355, V16.7.0, Dec. 2021, pp. 1-299.
"3rd Generation Partnership Project; Technical Specification Group Services and System Aspects; Telecommunication management; Performance Management (PM) for mobile networks that include virtualized network functions; Stage 2 (Release 16)", 3GPP TS 28.522, V16.0.0, Jul. 2020, pp. 1-7.
Office action received for corresponding Finnish U.S. Appl. No. 20/225,707, dated Dec. 21, 2022, 11 pages.
"3rd Generation Partnership Project; Technical Specification Group Radio Access Network; Evolved Universal Terrestrial Radio Access (E-UTRA) and NR; Study on enhancement for Data Collection for NR and EN-DC (Release 17)", 3GPP TR 37.817, V17.0.0, Apr. 2022, pp. 1-23.
Extended European Search Report received for corresponding European Patent Application No. 23186883.7, dated Dec. 20, 2023, 14 pages.
"Consideration on Alignment for Al/ML in NG-RAN Rel-17 Si", 3GPP TSG-RAN WG3 Meeting #115-e, R3-221941, Agenda: 18.1, Intel Corporation, Feb. 21-Mar. 3, 2022, 6 pages.
"Summary of CB: # AIRAN2_ESSolution", 3GPP TSG-RAN WG3 #114-e, R3-216214, Agenda: 18.4.1, ZTE, Nov. 1-11, 2021, 28 pages.

* cited by examiner

NETWORK ENERGY SAVING MODE ENHANCEMENTS

TECHNICAL FIELD

Various embodiments relate to wireless communications.

BACKGROUND

Energy saving functionality may be utilized to reduce network energy consumption and energy-related operational expenses. Energy saving deployments consider capacity booster cells that are deployed on top of and in addition to coverage cells to enhance capacity for, for example, the universal mobile telecommunications system (UMTS) radio access network (UT-RAN or E-UTRAN), long term evolution (LTE, the same as E-UTRA), or new radio (NR). Energy efficiency of capacity booster cells can be optimized by allowing a capacity booster cell being switched off when the additional capacity is not needed and re-activated on demand An access node may trigger energy saving actions by switching-off a capacity cell and transferring the related traffic to a coverage cell.

BRIEF DESCRIPTION

According to an aspect, there is provided the subject matter of the independent claims. Embodiments are defined in the dependent claims. One or more examples of implementations are set forth in more detail in the accompanying drawings and the description below. Other features will be apparent from the description, drawings, and the claims.

LIST OF DRAWINGS

In the following, various example embodiments will be described in greater detail with reference to the accompanying drawings, in which FIG. 1 illustrates an example embodiment of a cellular communication network;

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), world-wide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
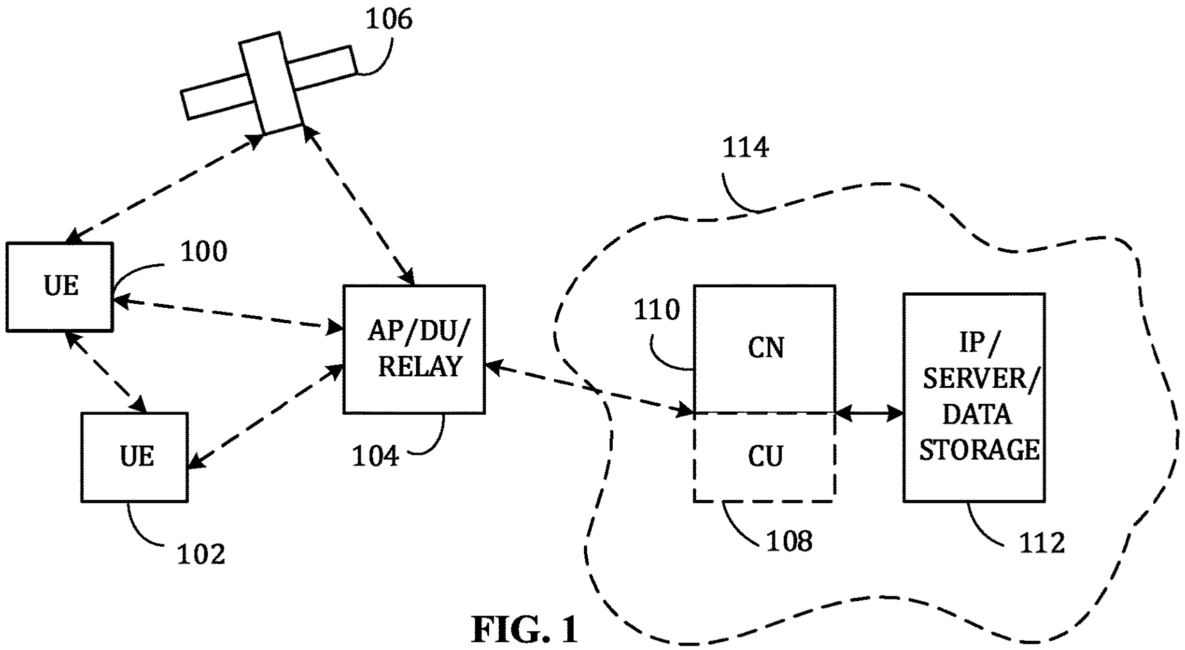

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. A user device may also communicate directly with another user device via sidelink (SL) communication. It should be appreciated that (e/g) NodeBs or their functionalities may be implemented by using any node, host, server or access point (AP) etc. entity suitable for such a usage.

A communications system may comprise more than one (e/g)NodeB, in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node.

An example of such a relay node is a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and user device(s), and/or between the IAB node and other IAB nodes (multi-hop scenario).

Another example of such a relay node is a layer 1 relay called a repeater. The repeater may amplify a signal received from an access node and forward it to a user device, and/or amplify a signal received from the user device and forward it to the access node.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput, and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets, and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes, or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB.

Furthermore, the access node may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP), and/or packet data convergence protocol (PDCP), of the access node. The DU may be defined as a logical node hosting radio link control (RLC), medium access control (MAC), and/or physical (PHY) layers of the access node. The CU may further comprise a user plane (CU-UP), which may be defined as a logical node hosting the user plane part of the PDCP protocol and the SDAP protocol of the CU for the access node.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, or example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto-, or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability, and affordability. In addition to these, 6G is also targeting new use cases covering the integration of localization and sensing capabilities into system definition to unifying user experience across physical and digital worlds.

5G and 6G networks, and beyond, are expected to use artificial intelligence or machine learning in controlling energy saving functionalities. Below different examples of how to at least obtain data for training and re-training of the artificial intelligence or machine learning model are discussed, using data related to a first radio cell as a non-limiting example. The first radio cell may be, for example, a capacity booster cell that may be deployed on top of a coverage cell to enhance capacity. The capacity booster cell may be allowed to be optimized by being switched off when capacity is not needed and re-activated on demand The first radio cell may also be, for example, a coverage cell that may be switched off. The artificial intelligence or machine learning model may be a different model for different access nodes, or it may be shared by a plurality of access nodes, or it may one model shared by the radio access network.

Figure 2:
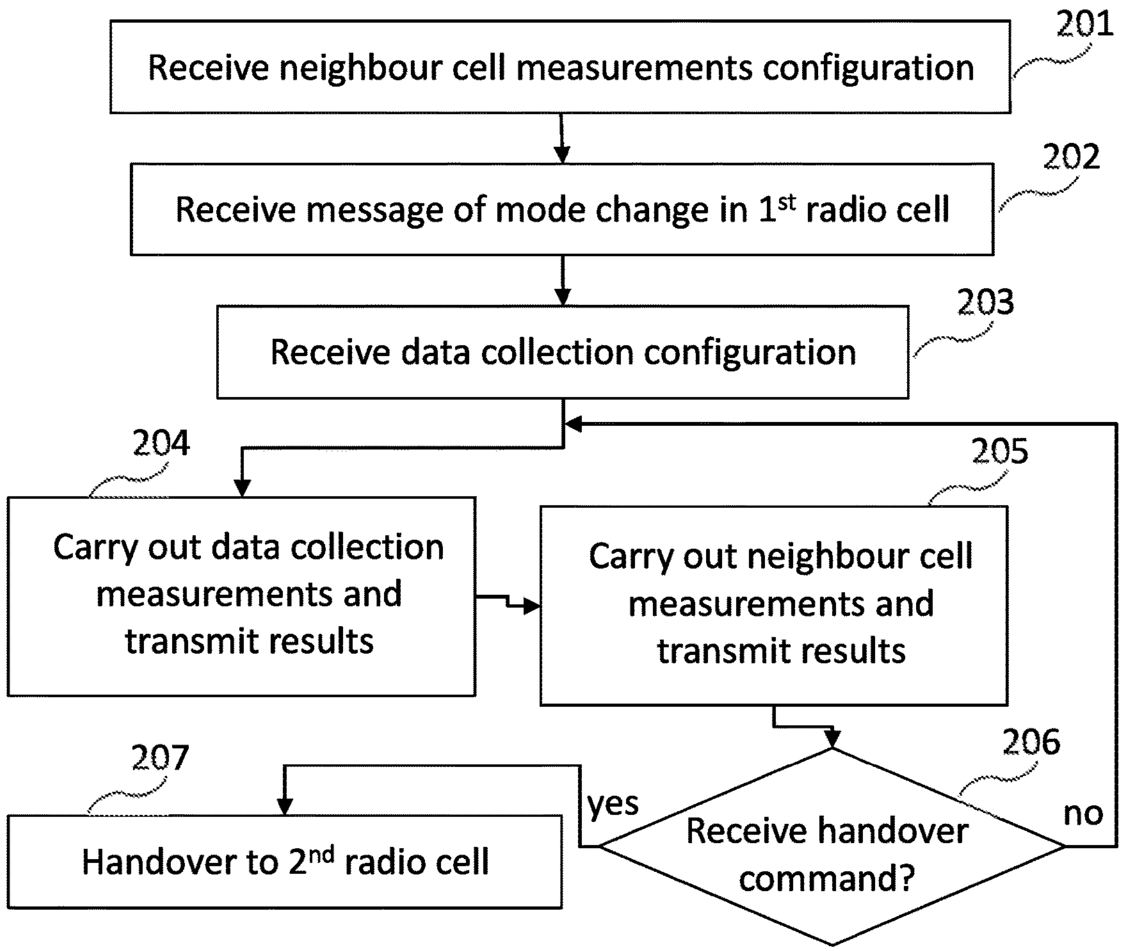
FIG. 2 illustrates a flow chart.

FIG. 2 illustrates a flow chart according to an example functionality of an apparatus configured to receive measurement and reporting configurations and to apply them, for example to collect data for training an artificial intelligence or machine learning (AI/ML) model that may be used in controlling the energy saving functionalities.

Referring to FIG. 2, a configuration for neighbour cell measurements is received in block 201 from an access node. The configuration for neighbour cell measurements may also have been received earlier as part of a normal procedure. The apparatus may receive the configuration for neighbour cell measurements in system information (SI), for example, during cell selection or re-selection processes, during returning from out of coverage, when receiving an indication that SI is modified, when receiving a public warning system (PWS) modification, when entering the communication network, or when reconfiguration with synchronization is finished. A message comprising information associated with a mode change in a first radio cell to an energy saving mode is received in block 202 from the access node. The change of mode may further be associated to an energy saving AI/ML decision that predicts that the first radio cell is expected to soon enter energy saving mode. The message may be, for example, a short message transmitted on physical downlink control channel (PDCCH) using paging radio network temporary identifier (P-RNTI) with or without associated paging message using short message field. Spare bits of the short message may be used for this. Data collection configuration information for carrying out data collection measurements for training an artificial intelligence or machine learning model is received in block 203 in relation to the message. The artificial intelligence or machine learning model in training may be an artificial intelligence or machine learning model deciding the mode change in block (202), e.g., predicting that the capacity booster cell will be switched off in a future time. The apparatus may receive the information in a system information block SIBx, dedicated to conveying data collection configuration information, or in a modified system information block SIB 1. Further information may be read by the apparatus, for example, in system information blocks SIB3/4/5. Depending on an implementation, the information may be read by the apparatus at next system information cycle, or the apparatus may request the information, for example, by using an on demand system information request, and then read the information in a response to the request. The data collection configuration information, i.e., information on a data collection configuration, may indicate a preset configuration or comprise the configuration or a part of the configuration. The preset data collection configuration may be a radio resource control (RRC) measurement configuration that will be applied in response to the apparatus receiving information that the energy saving mode will be activated and which may have been received earlier as part of the normal procedure. The configuration may also comprise a set of prioritized frequencies and/or cells that the apparatus should prioritize with the data collection measurements. The information may also comprise a set of blacklisted frequencies and/or cells the apparatus should avoid with the data collection measurements. Information on the blacklisted cells and/or frequencies may be received, for example, in SIB3: intraFreqBlackCellList, SIB4: interFreqBlackCellList, or Sib5: eutra-BlackCellList. The data collection measurements are carried out and the related results transmitted in block 204 to the access node. The data collection measurements are carried out in block 204 according to the data collection configuration at least until a handover procedure associated with the mode change is started, or until a new command to stop the data collection is received from the access node. In the illustrated example, the data collection measurements are carried out until a handover command is received. The data collection measurements may be radio resource control measurements, for example, reference signal received power (RSRP) or reference signal received quality (RSRQ). The neighbour cell measurements are carried out and the related results transmitted in block 205 to the access node for the handover procedure. The measurements and reporting in blocks 204 and 205 are performed in the illustrated example until in block 206 it is detected that a handover command for the handover procedure associated with the mode change is received. When the handover command is received (block 206: yes), the process continues in block 207 with a handover to a second cell. The second cell may be a coverage cell or another capacity booster cell that is not switched off. The data collection measurements and the neighbour cell measurements may also be carried out in a different order, and the frequency of the measurements may be different, for example data collection measurements may be carried out every X seconds, and neighbour cell measurements every Z seconds, X being smaller than Z.

Figure 3:
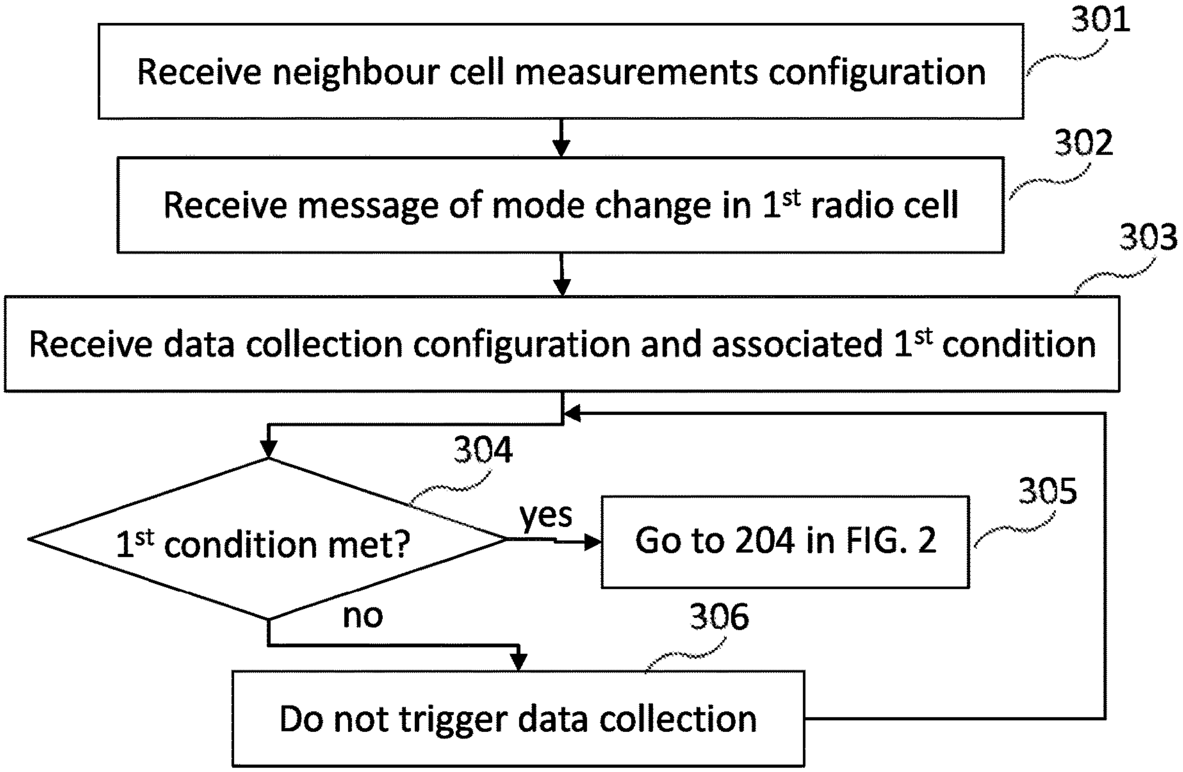
FIG. 3 illustrates a flow chart.

FIG. 3 illustrates a flow chart according to an example functionality of an apparatus in an implementation in which only a subset of apparatuses is to be configured to receive measurement and reporting configurations and to apply them, for example to collect data for training an artificial intelligence or machine learning model that may be used in controlling the energy saving functionality.

Referring to FIG. 3, a configuration for neighbour cell measurements is received in block 301 from an access node. A message comprising information associated with a mode change in a first radio cell to an energy saving mode is received in block 302 from the access node. Data collection configuration information for carrying out data collection measurements for training an artificial intelligence or machine learning model and an associated first condition are received in block 303 in relation to the message. The first condition may comprise a service identifier, a slice identifier, a quality of service identifier, for example 5QI, a public land mobile network (PLMN) identifier, an identifier identifying a non-public network (NPN), e.g., a combination of a PLMN identifier and a network identifier (NID) that identifies a standalone NPN (S-NPN), or a CAG-ID identifying a public network integrated NPN (PNI-NPN). The first condition may further be area-dependent, comprising a cell or a list of cells, UE state-dependent and depending on the UE remaining battery life or UE type, to give some examples. For example, the first condition may indicate a bearer with 5QI, and the apparatus has such a bearer active. The first condition may be determined as met if at least one of the identifiers comprised in the first condition corresponds to an active bearer, or it may also be determined as met when a plurality of identifiers comprised in the first condition corresponds to active bearers. The identifiers comprised in the first condition may also have a priority order in which the apparatus checks if they correspond to an active bearer. The first condition may also comprise a specific trace identifier to trigger a subset of apparatuses to report measurements based on, for example, cell-based criteria. The first condition may also comprise one or more identifiers of apparatuses to be configured, which may have been determined using a randomizing factor to avoid synchronizing a large number of apparatuses to report at the same time. The first condition may also be based on an energy saving event, which may be determined, for example, by comparing the serving cell or frequency to the best neighbour cell/frequency according to a threshold. The threshold may be defined different for model training phase and model inference phase, or it may be defined the same. The process checks in block 304 if the first condition is met. If the first condition is met (block 304: yes), further information may be read by the apparatus, for example, in system information blocks SIB3/4/5 and the process continues in block 305 to block 204 in FIG. 2. If the first condition is not met (block 305: no), the data collection configuration is ignored and data collection is not triggered in block 306. Even though not illustrated in FIG. 3, the apparatus carries out neighbour cell measurements according to the normal procedure and transmits related results to the access node for the handover procedure. The process may also continue to again check in block 304 if the first condition is met.

Figure 4:
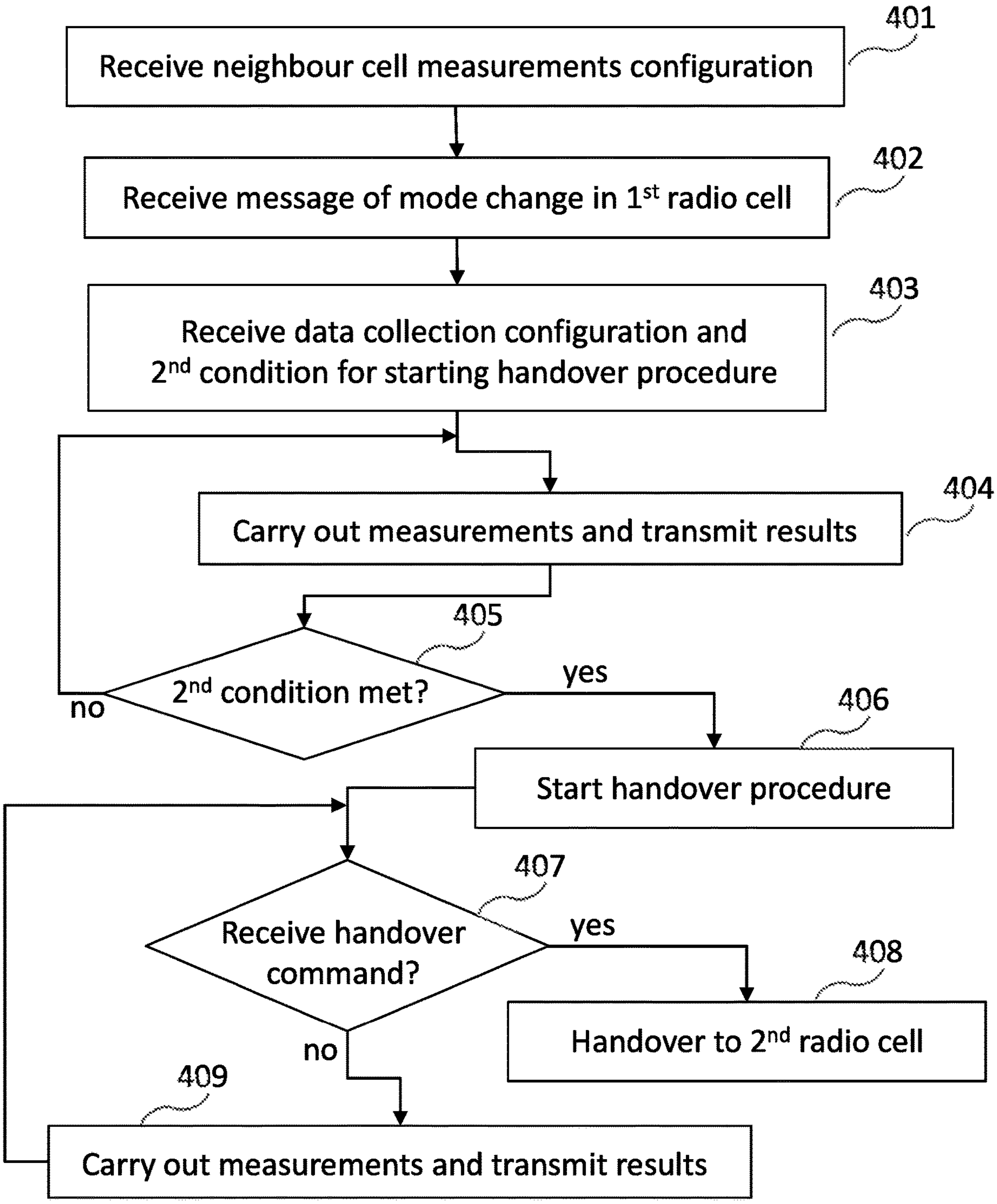
FIG. 4 illustrates a flow chart.

FIG. 4 illustrates a flow chart according to an example functionality of an apparatus configured to collect data for training an artificial intelligence or machine learning model in an implementation including pro-active handovers. The pro-active handover may be triggered even when the first cell is still better than the second cell, as opposed to the classical "reactive" handover. The example functionality may be combined with any of the functionalities described with FIG. 2 or 3.

Referring to FIG. 4, a configuration for neighbour cell measurements is received in block 401 from an access node. A message comprising information associated with a mode change in a first radio cell to an energy saving mode is received in block 402 from the access node. Data collection configuration information for carrying out data collection measurements for training an artificial intelligence or machine learning model and associated second condition for starting a handover procedure are received in block 403 in relation to the message. The second condition is a condition for the pro-active handover. The second condition may be at least one of, for example, that a difference between the first radio cell and a highest priority neighbour cell becomes smaller than a threshold, or a difference between a serving frequency and a highest priority neighbour frequency becomes smaller than a threshold. The highest priority neighbour cell/frequency may be a coverage cell/frequency that has a low priority for energy saving due to that, for example, it may be energy-efficient (in terms of a bits/joule metric) compared to other cells/frequencies, or it may have a low energy-consumption. The second condition may also be at least one of, for example, a difference between the first radio cell and a best neighbour cell that is not one of blacklisted cells becomes smaller than a threshold, or a difference between the serving frequency and a best neighbour frequency that is not one of blacklisted frequencies becomes smaller than a threshold. A blacklisted cell/frequency may be a cell/frequency that has been indicated to be switched off, it may have a high energy-consumption (in terms of consumed joules), or it may have a low energy-efficiency compared to other frequencies/cells. The second condition may also comprise a number of times the measurements are to be carried out before starting a pro-active handover procedure, for example, indicating the apparatus to carry out the measurements once and then start the handover procedure. The second condition may also comprise a predetermined time period after receiving the second condition after which the pro-active handover procedure is to be started. The data collection measurements and neighbour cell measurements are carried out and the related results transmitted in block 404 to the access node, as described with FIG. 2 above, until it is detected in block 405 that the second condition is met. When the second condition is met (block 405: yes), the pro-active handover procedure is started in block 406. The process checks in block 407 if a handover command is received. The handover command is a handover command for the pro-active handover associated with the mode change. If the handover command is received (block 407: yes), the process continues in block 408 by carrying out a handover to a second radio cell. If no handover command is received (block 407: no), the measurements are carried out and the related results transmitted in block 409 to the access node, as described above, until the handover command is received.

Figure 5:
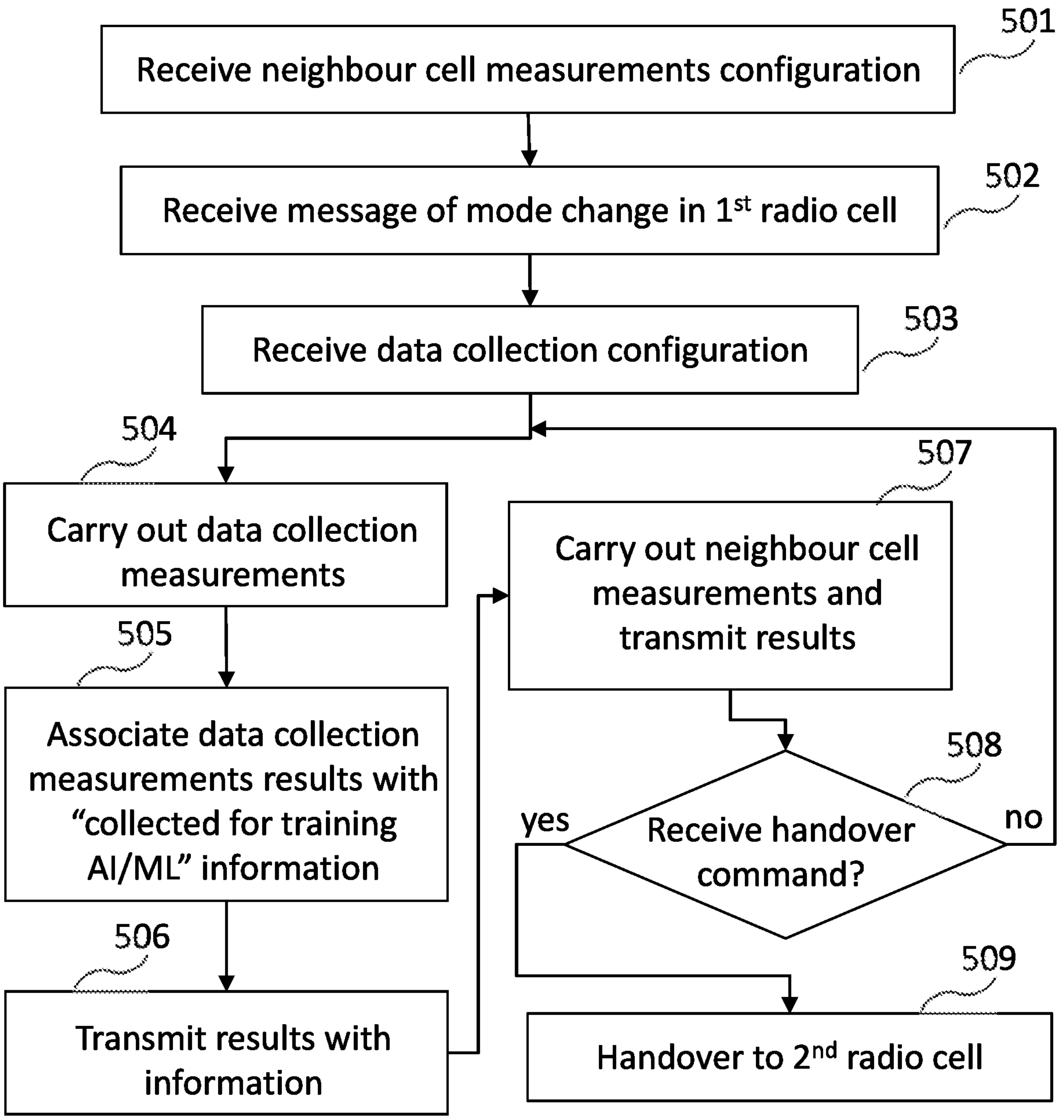
FIG. 5 illustrates a flow chart.

FIG. 5 illustrates a flow chart according to an example functionality of an apparatus configured to collect data for training an artificial intelligence or machine learning model used in controlling the energy saving functionalities in an implementation including associating data collection measurements related results with additional information to help distinguishing the results from other measurements related results to obtain data for the training. The example functionality may be combined with any of the functionalities described with FIGS. 2 to 4.

Referring to FIG. 5, a configuration for neighbour cell measurements is received in block 501 from an access node. A message comprising information associated with a mode change in a first radio cell to an energy saving mode is received in block 502 from the access node. Data collection configuration information for carrying out data collection measurements for training an artificial intelligence or machine learning model is received in block 503 in relation to the message. The data collection measurements are carried out in block 504. The data collection measurements related results are associated in block 505 with additional information indicating that the results are data collected for training the artificial intelligence or machine learning model. The additional information may also comprise an identifier that may be used to identify the apparatus that has provided the measurements, for example, a trace identifier that has been used to collect measurements. Thus, collecting measurements may be limited to a specific trace identifier that may trigger a subset of apparatuses to report measurements based on, for example, cell-based criteria. The results are then transmitted in block 506 to the access node. The data collection measurements are carried out in block 504 according to the data collection configuration at least until a handover procedure associated with the mode change is started. The neighbour cell measurements are carried out and the related results transmitted in block 507 to the access node for the handover procedure. The measurements and reporting in blocks 504 and 507 are performed in the illustrated example until it is detected in block 508 that a handover command for the handover procedure associated with the mode change is received. When the handover command is received (block 508: yes), the process continues in block 509 with a handover to a second cell.

Figure 6:
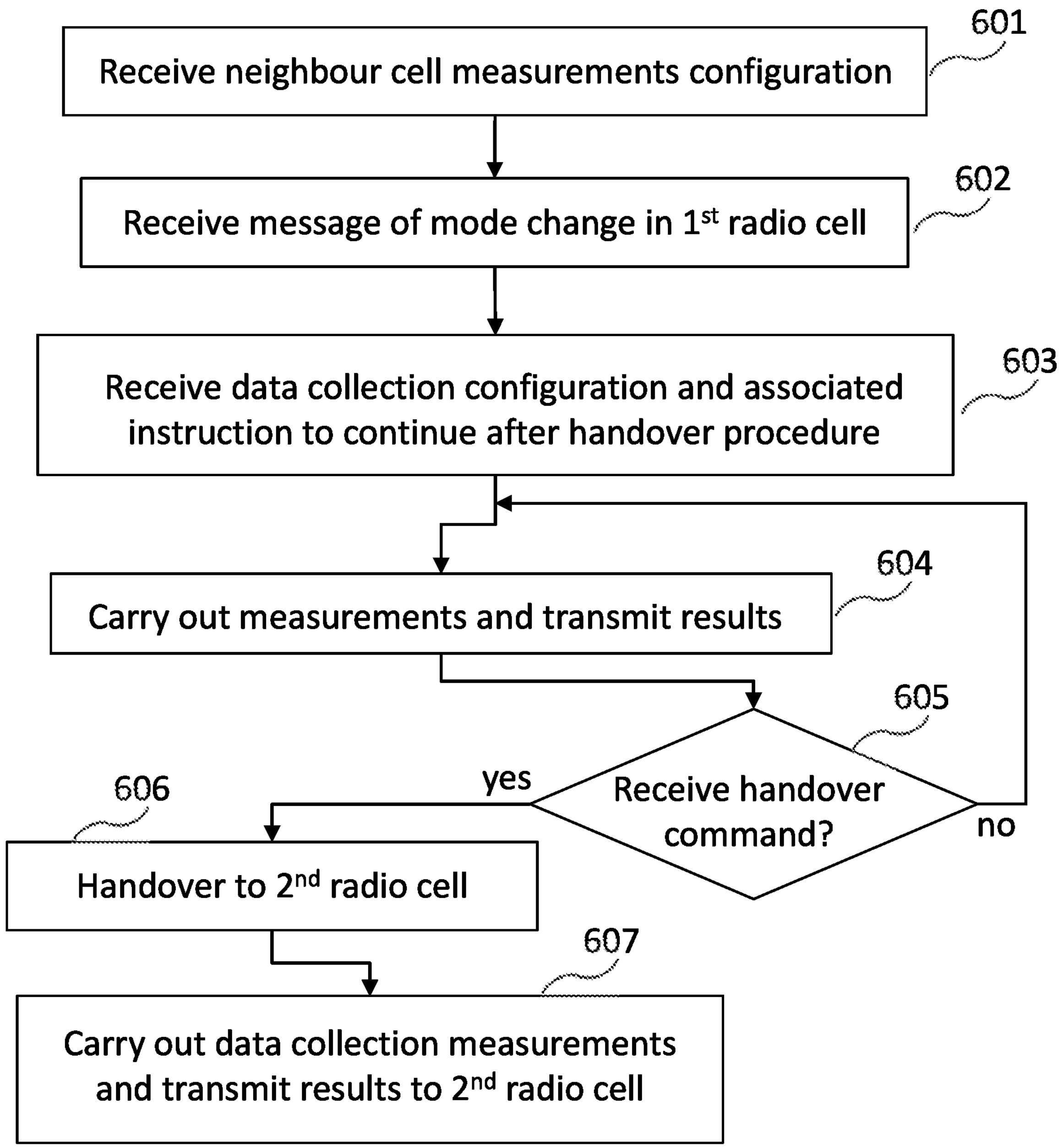
FIG. 6 illustrates a flow chart.

FIG. 6 illustrates a flow chart according to an example functionality of an apparatus configured to collect data for training an artificial intelligence or machine learning model used in controlling the energy saving functionalities in an implementation including continuing measurements and reporting after a pro-active handover to obtain information from the whole time before a cell is switched off. The example functionality may be combined with any of the functionalities described with FIGS. 2 to 5.

Referring to FIG. 6, a configuration for neighbour cell measurements is received in block 601 from an access node. A message comprising information associated with a mode change in a first radio cell to an energy saving mode is received in block 602 from the access node. Data collection configuration information for carrying out data collection measurements for training an artificial intelligence or machine learning model and an associated instruction to continue carrying out the data collection measurements and transmitting after a handover procedure are received in block 603 in relation to the message. The data collection measurements and the neighbour cell measurements are carried out and the related results transmitted in block 604 to the access node. The measurements and reporting in block 604 are performed in the illustrated example until it is detected in block 605 that a handover command for the handover procedure associated with the mode change is received. When the handover command is received (block 605: yes), the process continues in block 606 with a handover to a second cell. The handover command may comprise instructions on whether to continue the measurements and reporting after handover. After the handover to the second cell, the data collection measurements are carried out and the related results transmitted in block 607 to the second radio cell. The configuration may comprise, for example, a time period for how long the measurements and reporting will be continued. The apparatus may also be instructed by the second radio cell whether to continue the measurements and reporting, and/or when to terminate the measurements and reporting.

Figure 7:
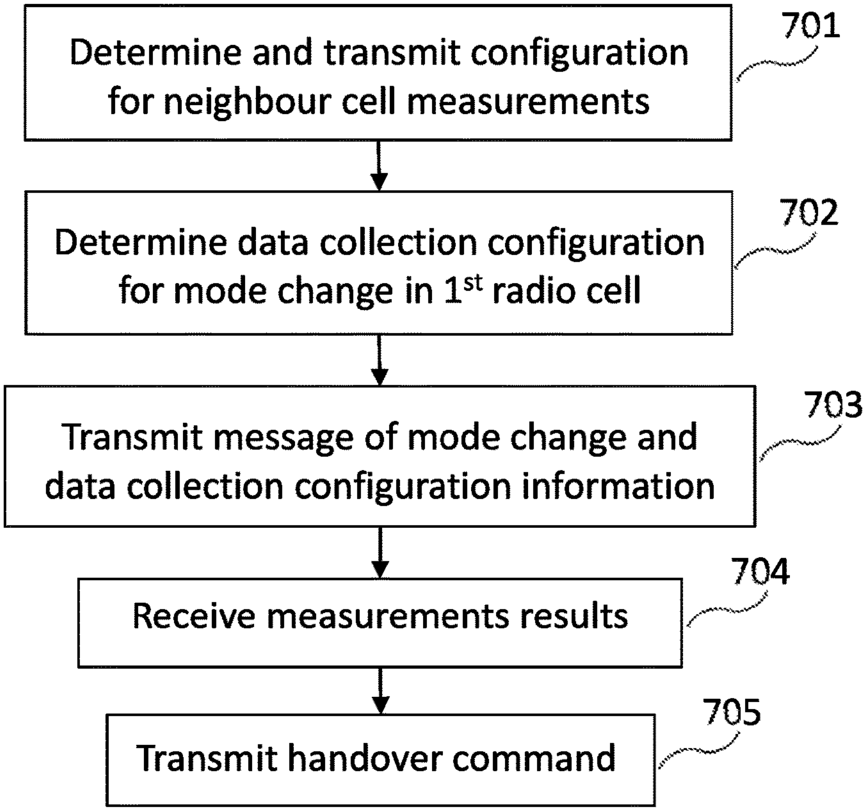
FIG. 7 illustrates a flow chart.

FIG. 7 illustrates a flow chart according to an example functionality of an apparatus configured to configure apparatuses, for example as described above with FIGS. 2 to 6, to collect data for training an artificial intelligence or machine learning model used in controlling the energy saving functionalities relating to the apparatus.

Referring to FIG. 7, a configuration for neighbour cell measurements is determined and transmitted in block 701 at least to a plurality of apparatuses in a first radio cell. In the illustrated example, when a mode change in the first radio cell to an energy saving mode is initiated, a data collection configuration for carrying out data collection measurements for a mode change in the first radio cell to an energy saving mode is determined in block 702. The data collection measurements are carried out for obtaining training data for training or retraining the artificial intelligence or machine learning model and/or for obtaining input data (including inference data) to said artificial intelligence or machine learning model. The mode change may be performed by a power ramp-down method, wherein step size and step duration may be determined using load information or predicted load information available to the access node. The mode change may be also performed after a predetermined time period after information associated with the mode change has been transmitted. When the mode change in the first radio cell to the energy saving mode is initiated, a message comprising the information associated with the mode change and, in relation to the message, data collection configuration information are transmitted in block 703 to the plurality of apparatuses. The data collection configuration information, i.e., information on a data collection configuration, may indicate a preset configuration or comprise the configuration or a part of the configuration. Results related to the data collection measurements and the neighbour cell measurements for a handover procedure associated with the mode change are received in block 704 from at least one of the plurality of apparatuses. A handover command to carry out a handover to a second radio cell is transmitted in block 705 to the at least one apparatus.

Figure 8:
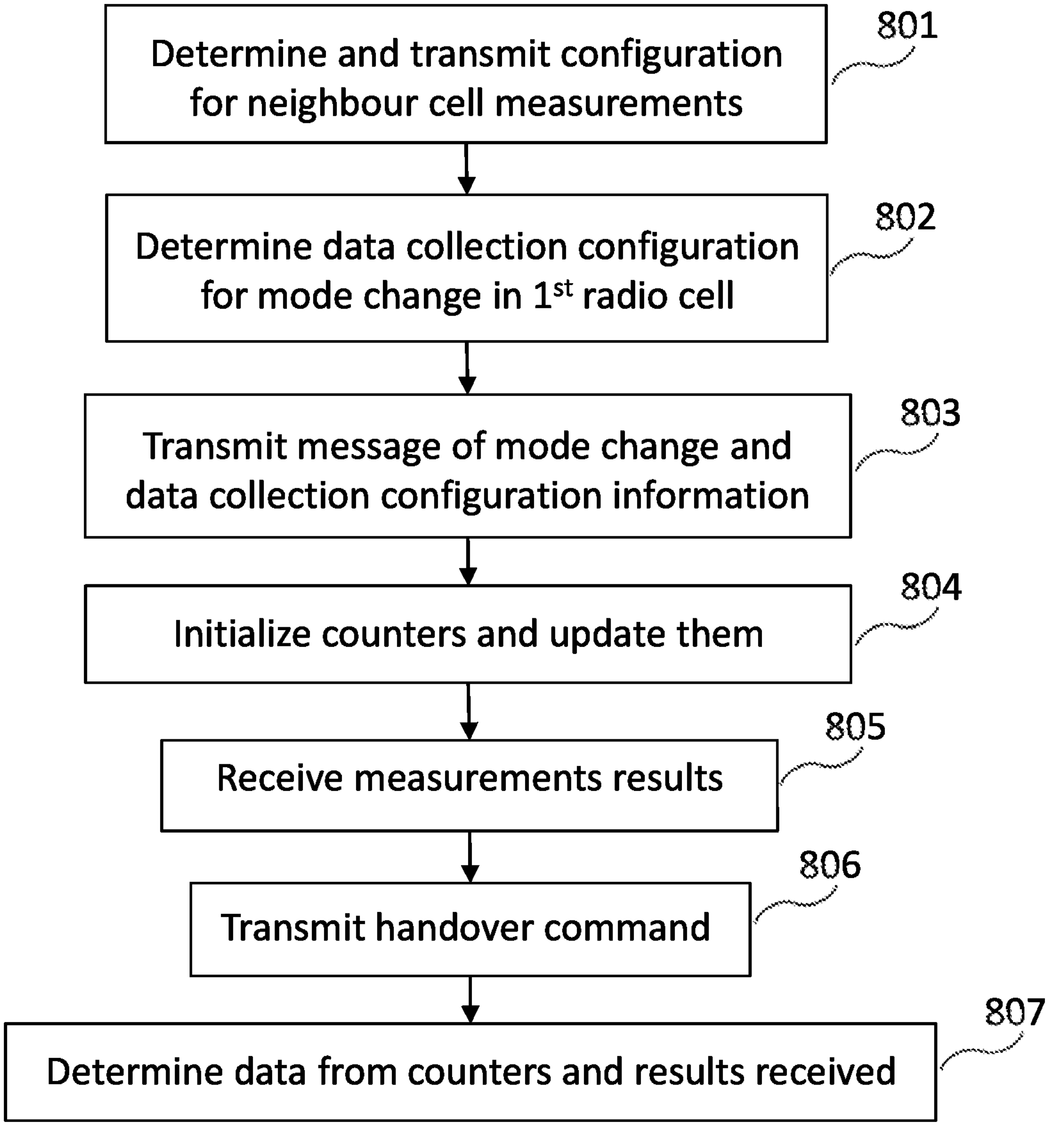
FIG. 8 illustrates a flow chart.

FIG. 8 illustrates a flow chart according to an example functionality of an apparatus configured to configure a subset of apparatuses to collect data for training an artificial intelligence or machine learning model used in controlling the energy saving functionalities.

Referring to FIG. 8, a configuration for neighbour cell measurements is determined and transmitted in block 801 at least to a plurality of apparatuses in a first radio cell. A data collection configuration for carrying out data collection measurements for a mode change in the first radio cell to an energy saving mode is determined in block 802. The data collection measurements are carried out for training an artificial intelligence or machine learning model used in controlling the mode change in the first radio cell. When the mode change in the first radio cell to the energy saving mode is initiated, a message comprising information associated with the mode change and, in relation to the message, data collection configuration information are transmitted in block 803 to the plurality of apparatuses. Counters for determining data are initialized in block 804. Results related to the measurements are received in block 805 from at least one of the plurality of apparatuses. A handover command to carry out a handover to a second radio cell is transmitted in block 806 to the subset of apparatuses. Data for training the artificial intelligence or machine learning model is determined in block 807 from the counters and the results received. The data may comprise at least one of: a number of radio link failures that occur after the mode change in the first radio cell to the energy saving mode is initiated, a number of connection re-establishments that occur after the mode change in the first radio cell to the energy saving mode is initiated, a number of handover preparation failures that occur after the mode change in the first radio cell to the energy saving mode is initiated, a handover success rate after the mode change in the first radio cell to the energy saving mode is initiated, a handover failure rate after the mode change in the first radio cell to the energy saving mode is initiated, a number of early handovers that occur after the mode change in the first radio cell to the energy saving mode is initiated, and/or a number of late handovers that occur after the mode change in the first radio cell to the energy saving mode is initiated.

Figure 9:
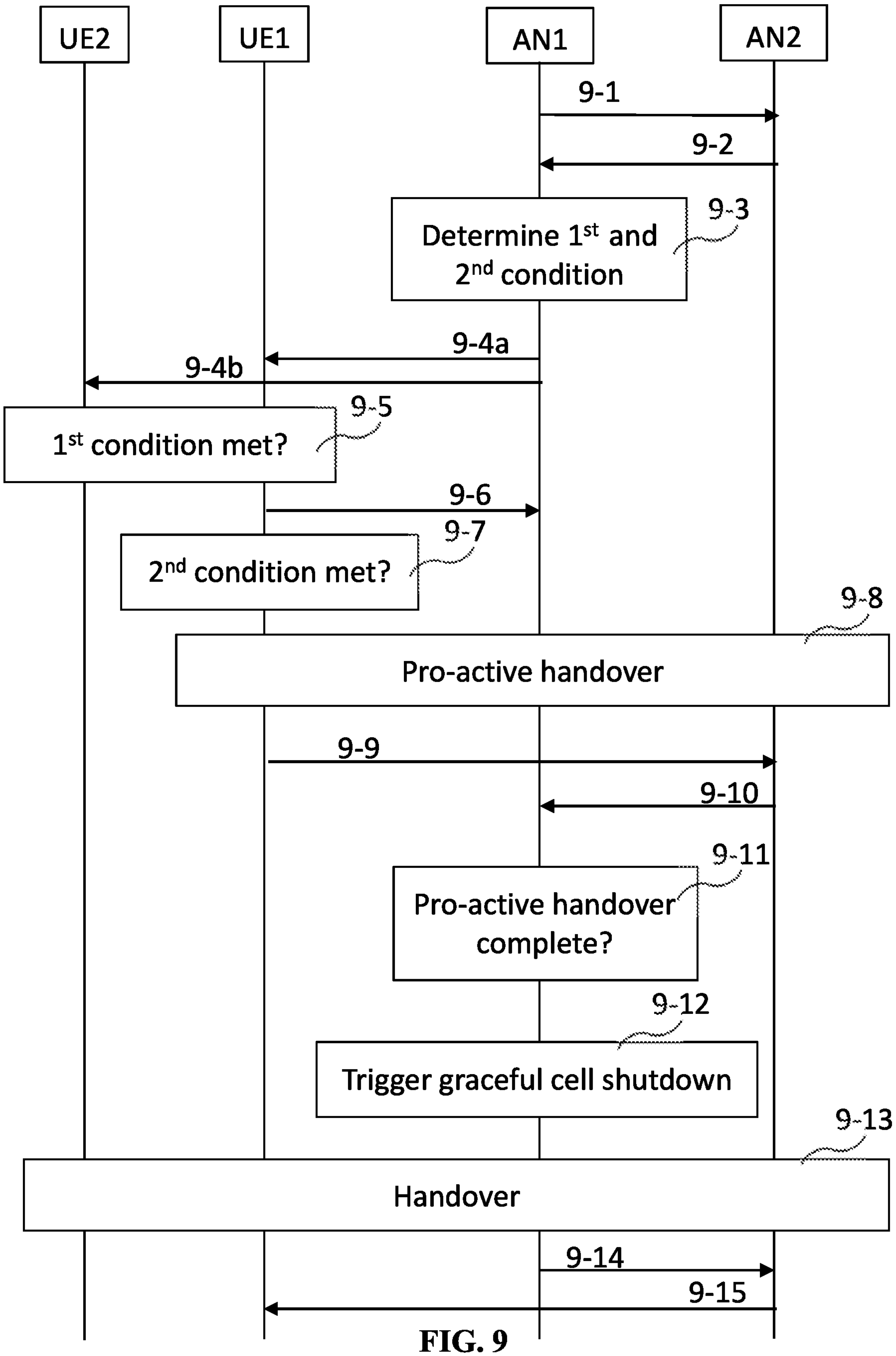
FIG. 9 illustrates a signalling diagram.
Figure 10:
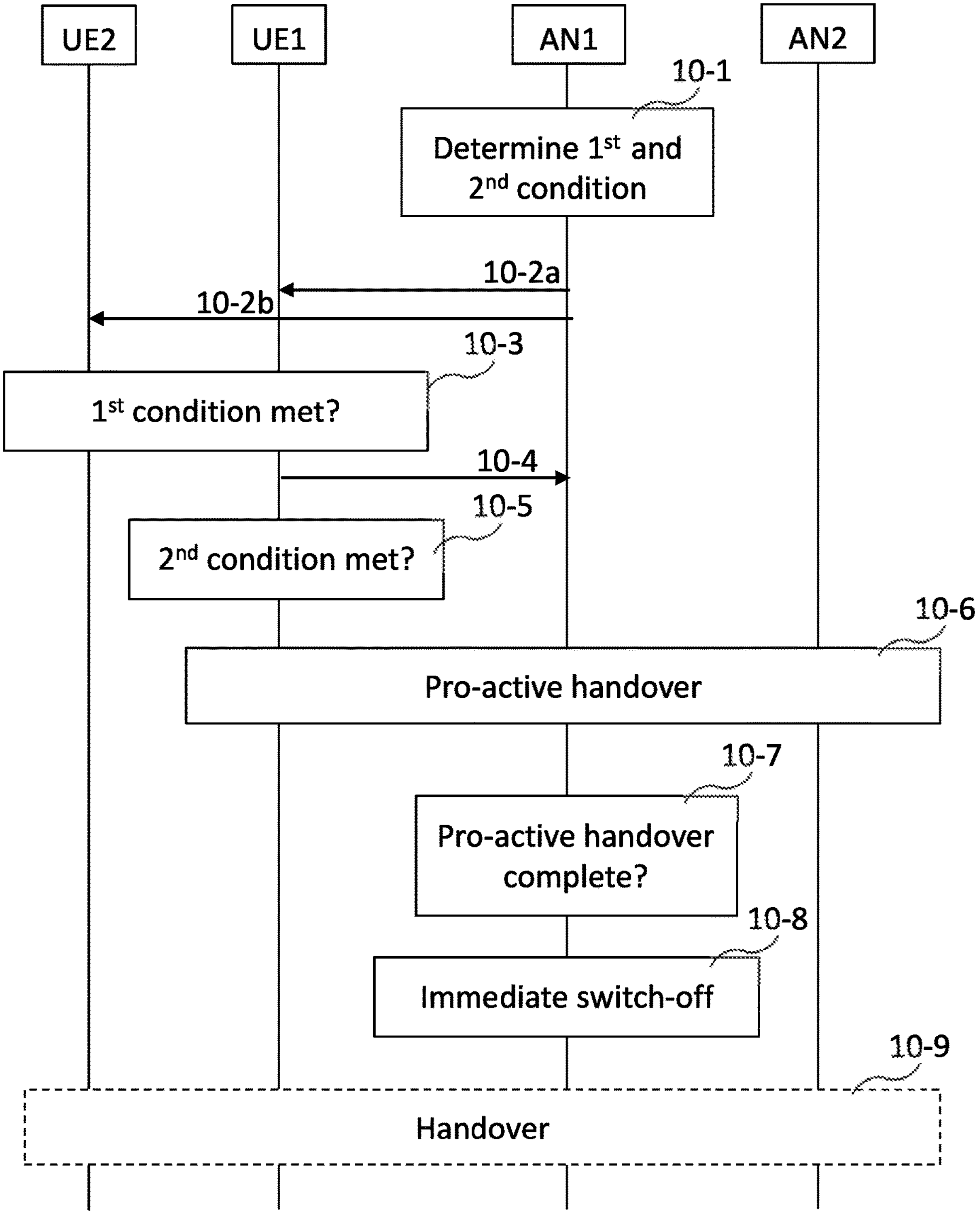
FIG. 10 illustrates a signalling diagram.

FIG. 9 and FIG. 10 illustrate signalling diagrams according to examples of information exchange in a communication network configured to collect data for training an artificial intelligence or machine learning model used in controlling the energy saving functionalities, and to initiate a prioritized handover mechanism to a subset of apparatuses when a mode change to an energy saving mode in a first radio cell is initiated. The trained artificial intelligence or machine learning model may be used in determining when the mode change is initiated. The pro-active handover mechanism may also reduce the number of undesirable radio link failure (RLF) events and shorten the time needed for cell shutdown. For the sake of clarity, messages associated with neighbour cell measurement configuration are not illustrated in FIG. 9 and FIG. 10. In FIG. 9 and FIG. 10, term "AN1" is used for a currently serving access node, i.e., an access node providing the first radio cell. Term "AN2" is used for an access node providing a target cell in the handover. The access nodes may be, for example, gNB(s) or a distributed access node, comprising for example a centralized unit (CU) and a distributed unit (DU) enabling RAN real time functions being carried out at the RAN side (in the DU) and non-real time functions being carried out in a centralized manner (in the CU). Term "UE1" is used for an apparatus, or a subset of apparatuses receiving configuration information for data collection and being handed over through a pro-active handover mechanism. Term "UE2" is used for another one or more apparatuses configured to be handed over through a legacy reactive handover mechanism.

Referring to FIG. 9, the AN1 transmits (message 9-1) to the AN2 a request to forward results related to data collection measurements to the AN1. Upon receiving said request, the AN2 acknowledges it by transmitting message 9-2. The request (message 9-1) and the acknowledgement (message 9-2) AN2 may also be transmitted later in the process, for example after block 9-5 or as part of the handover (block 9-8). A first condition for configuring a subset of apparatuses with a data collection configuration and a second condition for the pro-active handover are determined in block 9-3 by the AN1. The first condition may comprise a service identifier, a slice identifier, a quality of service identifier, for example 5QI, a public land mobile network (PLMN) identifier, an identifier identifying a non-public network (NPN), e.g., a combination of PLMN identifier and network identifier (NID) that identifies a standalone NPN (S-NPN), or a CAG-ID identifying a public network integrated NPN (PNI-NPN). The first condition may further be area-dependent, comprising a cell or a list of cells, UE state-dependent and depending on the UE remaining battery life or UE type, to give some examples. The first condition may be determined as met if at least one of the identifiers comprised in the first condition corresponds to an active bearer, or it may also be determined as met when a plurality of identifiers comprised in the first condition corresponds to active bearers. The first condition may also comprise a specific trace identifier to trigger a subset of apparatuses to report measurements based on, for example, cell-based criteria. The first condition may also comprise one or more identifiers of apparatuses to be configured, which may be determined using a randomizing factor to avoid synchronizing a large number of apparatuses to report at the same time. The first condition may also be based on an energy saving event, which may be determined, for example, by comparing the serving cell or frequency to the best neighbour cell/frequency according to a threshold. The threshold may be defined differently for model training phase and model inference phase, or it may be defined to be the same. The second condition may be at least one of, for example, that a difference between the first radio cell and a highest priority neighbour cell becomes smaller than a threshold, or a difference between a serving frequency and a highest priority neighbour frequency becomes smaller than a threshold. The highest priority neighbour cell/frequency may be a coverage cell/frequency that has a low priority for energy saving due to that, for example, it may be energy-efficient (in terms of a bits/joule metric) compared to other cells/frequencies, or it may have a low energy-consumption. The second condition may also be at least one of, for example, a difference between the first radio cell and a best neighbour cell that is not one of blacklisted cells becomes smaller than a threshold, or a difference between the serving frequency a best neighbour frequency that is not one of blacklisted frequencies becomes smaller than a threshold. A blacklisted cell/frequency may be a cell/frequency that has been indicated to be switched off, it may have a high energy-consumption (in terms of consumed joules), or it may have a low energy-efficiency compared to other frequencies/cells. The second condition may also comprise a number of times the measurements are to be carried out before starting the pro-active handover procedure, for example, indicating the apparatus to carry out the measurements once and then start the handover procedure. The second condition may also comprise a pre-determined time period after receiving the one or more conditions after which the pro-active handover procedure is to be started. Further, the AN1 transmits (messages 9-4*a* and 9-4*b*) to the UE1 and the UE2 a message comprising information associated with the mode change and, in relation to the message, data collection configuration information (messages 9-4*a* and 9-4*b*) comprising the first condition and the second condition. Upon receiving messages 9-4*a* and 9-4*b*, it is checked in block 9-5 by the UE1 and the UE2 if the first condition is met. In the illustrated example, the first condition is met by the UE1, and the UE1 transmits (message 9-6) results related to the data collection measurements to the AN1. In the illustrated example, the first condition is not met by the UE2, and the UE2 ignores message 9-4*b*. The UE2 may also respond to AN1 that the absence of measurements is due to the first condition not being met. It is checked in block 9-7 by the UE1 if the second condition is met. In response to the second condition being met, the UE1 is handed over in block 9-8 to AN2 through the pro-active handover mechanism, for example, by the UE1 transmitting a request for handover, and in response to the request receiving a handover command The actual handover procedure is similar to the procedure in the reactive handover, the difference being that the pro-active handover is triggered earlier. The UE1 transmits (message 9-9) results related to the data collection measurements to AN2 and the AN2 forwards (message 9-10) the results to the ANI. The AN1 checks in block 9-11 if the UE1, or all of the subset of UE1, is/are handed over and when it is/they are, then triggers in block 9-12 a graceful shutdown of the first radio cell. Then the UE2, or the subset of UE2s is/are handed over in block 9-13 to the AN2 through the legacy reactive handover mechanism. The cell switch-off may be carried out, for example, by a power ramp-down with steps whose duration and number may be provided in system information, until a complete cell switch-off is achieved. The trained artificial intelligence or machine learning model may be used in determining the duration and number of power ramp-down steps to obtain a reduced number of radio link failure events. In response to the first cell being switched-off, the AN1 transmits (message 9-14) to the AN2 information that the first cell is switched-off. In response to receiving message 9-14, the AN2 transmits (message 9-15) to the UE1 instructions on how to terminate carrying out the data collection measurements and transmitting the related results. Enabling pro-active handover of the UE1, which may be the most important subset of apparatuses, before shutdown may reduce the number of undesirable radio link failure (RLF) events and shorten the duration of time before a desired cell switch-off. The results related to the data collection measurements may be mapped to current energy saving policy, and they may help updating the current energy saving policy with respect to how successful the handover was. In another example without the first condition, there is no UE2. Then block 9-11 may be replaced with, for example, a predefined time after sending message 9-4*a*, after which the subset of UE1s that have not yet been handed over in block 9-8 through the pro-active handover mechanism will be handed over in block 9-13 through the legacy reactive handover mechanism.

Referring to FIG. 10, a first condition for configuring a subset of apparatuses with a data collection configuration and a second condition for the pro-active handover are determined in block 10-1 by the AN1 as explained in more detail above with FIG. 9. The AN1 transmits (messages 10-2*a* and 10-2*b*) to the UE1 and the UE2 a message comprising information associated with the mode change and, in relation to the message, data collection configuration information (messages 10-2*a* and 10-2*b*) comprising the first condition. Upon receiving messages 10-2*a* and 10-2*b*, it is checked in block 10-3 by the UE1 and the UE2 if the first condition is met. In the illustrated example, the first condition is met by the UE1, and the UE1 transmits (message 10-4) results related to the data collection measurements to the AN1. In the illustrated example, the first condition is not met by the UE2, and the UE2 may ignore message 10-2*b* (as an alternative the UE2 may respond that the absence of measurements is due to the first condition not being met). It is checked in block 10-5 by the UE1 if the second condition is met. In response to the second condition being met, the UE1 is handed over in block 10-6 to AN2 through the pro-active handover mechanism, for example, by the UE1 transmitting a request for handover, and in response to the request receiving a handover command The AN1 checks in block 10-7 if the UE1, or all of the subset of UE1, is/are handed over, and when it is/they are, then switches off in block 10-8 the first radio cell. Then the UE2, or subset of UE2s is/are handed over in block 10-9 to the AN2 through the legacy reactive handover mechanism. Enabling pro-active handover of the UE1, which may be the most important apparatuses, before shutdown may reduce the number of undesirable radio link failure (RLF) events. In another example without the first condition, there is no UE2. Then block 10-7 may be replaced with, for example, a predefined time after sending message 10-2*a*, after which the subset of UE1s that have not yet been handed over in block 10-6 through the pro-active handover mechanism will be handed over in block 10-9 through the legacy reactive handover mechanism.

Figure 11:
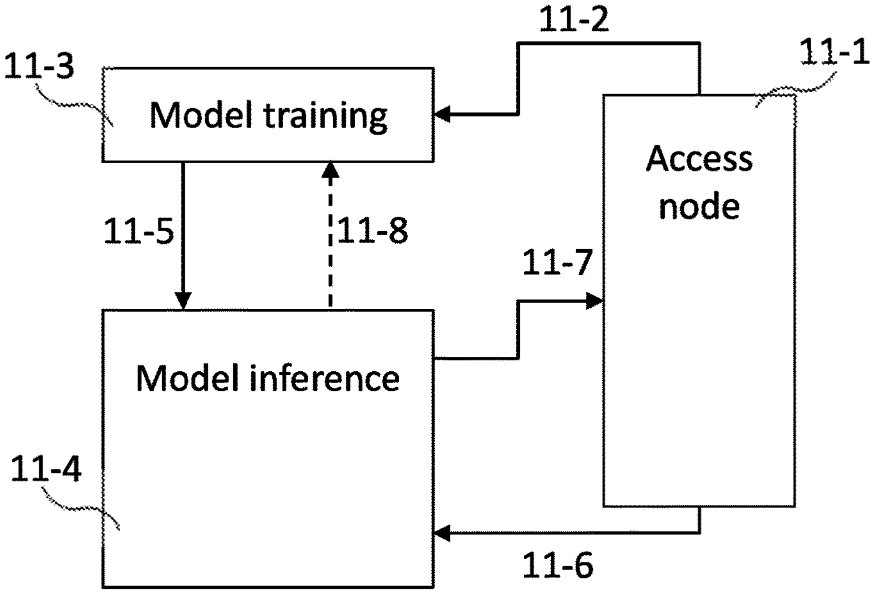
FIG. 11 illustrates a signalling diagram.

FIG. 11 illustrates a signalling diagram according to an example of information exchange in a communication network configured to train an artificial intelligence or machine learning model and use the trained model in controlling the energy saving functionalities. The illustrated entities are logical entities that may locate in one node, in which case the information exchange may be internal information exchange, or the logical entities may locate in different nodes, or two of them may locate in one node and one in a further node. Further, the communication network may comprise a plurality of any of the illustrated logical entities. The term "Access node" is used for an access node collecting data for training the artificial intelligence or machine learning model. Term "Model training" is used for the process of training the artificial intelligence or machine learning model with the data collected. The structure of the artificial intelligence of machine learning model is not significant regarding collecting data for training the model and it is therefore not described in more detail here. Term "Model inference" is used for the process of using the trained artificial intelligence or machine learning model in controlling the energy saving functionalities. It should be appreciated that the signalling illustrated may be internal signalling within an access node, or an access node may be configured to perform training the artificial intelligence or machine learning model.

Referring to FIG. 11, the Access node 11-1 transmits (message 11-2) collected input data to Model training 11-3. Input data for the artificial intelligence or machine learning model may comprise, for example, information on coverage cells and capacity cells, preventive maintenance counters on radio link failure events, preventive maintenance counters on re-establishment events, preventive maintenance counters on handover preparation failures to neighbour cells during cell shutdown period triggered by the mode change, preventive maintenance counters on handover success and/or failure rates to the neighbour cells during cell shutdown period, preventive maintenance counters on mobility robustness optimization (MRO), energy efficiency and/or energy consumption of the neighbour cells, and/or resource status of the neighbour cells. Parameters obtained by training the artificial intelligence or machine learning model are then transmitted (message 11-5) to Model inference 11-4. The Access node 11-1 transmits (message 11-6) collected input data to Model inference and receives (message 11-7) artificial intelligence or machine learning model output for controlling the energy saving functionalities. Inference data, that is, the output of the artificial intelligence or machine learning model inference, may comprise cell shutdown policy parameters, for example, start time, duration, and/or step size for the power-ramp down, resource status of the neighbour cells, and/or evaluation criteria that may maximize the handover success rate. The output of the trained artificial intelligence or machine learning model may be used to update cell shutdown policy parameters. Performance of the trained artificial intelligence or machine learning model may be monitored by observing a reduction of radio link failure events and an increase of handover success key performance indicators. Model performance feedback may be transmitted (message 11-8) from Model inference to Model training for further training of the artificial intelligence or machine learning model and updated artificial intelligence or machine learning model parameters may be transmitted (message 11-5) from Model training to Model inference.

As can be seen from the above examples, the additional configuration for measurements may enable, for example, obtaining training data from UEs, triggering handover with conditions suitable for entering an energy saving mode, and optimizing energy saving cell shutdown policy parameters according to the deployment area (for example urban or rural) to obtain dynamic policies used for cell switch-off decision instead of static policies.

The blocks, related functions, and information exchanges (messages) described above by means of FIGS. 2 to 11 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 12:
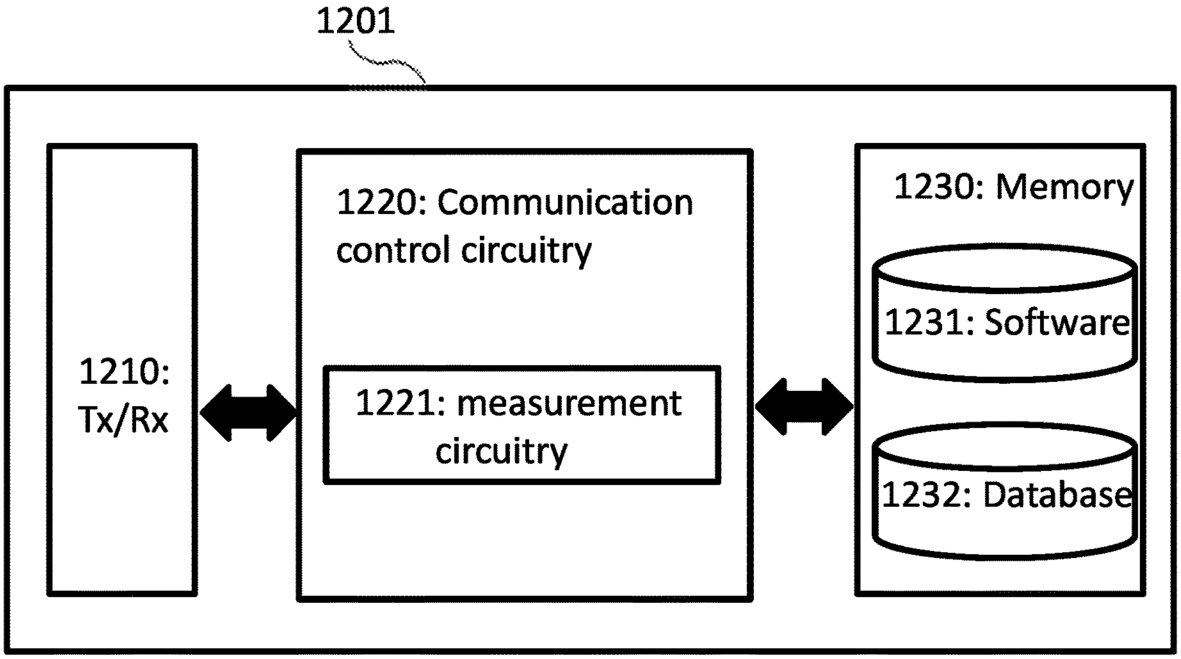
FIG. 12 illustrates an example embodiment of an apparatus.

FIG. 12 illustrates an example embodiment of an apparatus 1201, which may be an apparatus such as, or comprised in, a user device. The apparatus 1201 may correspond to any of the user devices 100, 102 of FIG. 1. The apparatus may also be called a subscriber unit, mobile station, remote terminal, access terminal, user terminal, terminal device, user equipment (UE), vehicle, or any electric device.

The apparatus 1201 may comprise one or more communication control circuitry 1220, such as at least one processor, and at least one memory 1230, including one or more algorithms 1231, such as a computer program code (software) wherein the at least one memory and the computer program code (software) are configured, with the at least one processor, to cause the apparatus to carry out any one of the example functionalities of the apparatus described above. Said at least one memory 1230 may also comprise at least one database 1232.

Referring to FIG. 12, the one or more communication control circuitry 1220 of the apparatus 1201 comprise at least measurement circuitry 1221 which is configured to perform data collection measurements according to embodiments. To this end, the measurement circuitry 1221 of the apparatus 1201 is configured to carry out at least some of the functionalities of the apparatus described above, e.g., by means of FIGS. 2 to 11, using one or more individual circuitries.

Figure 13:
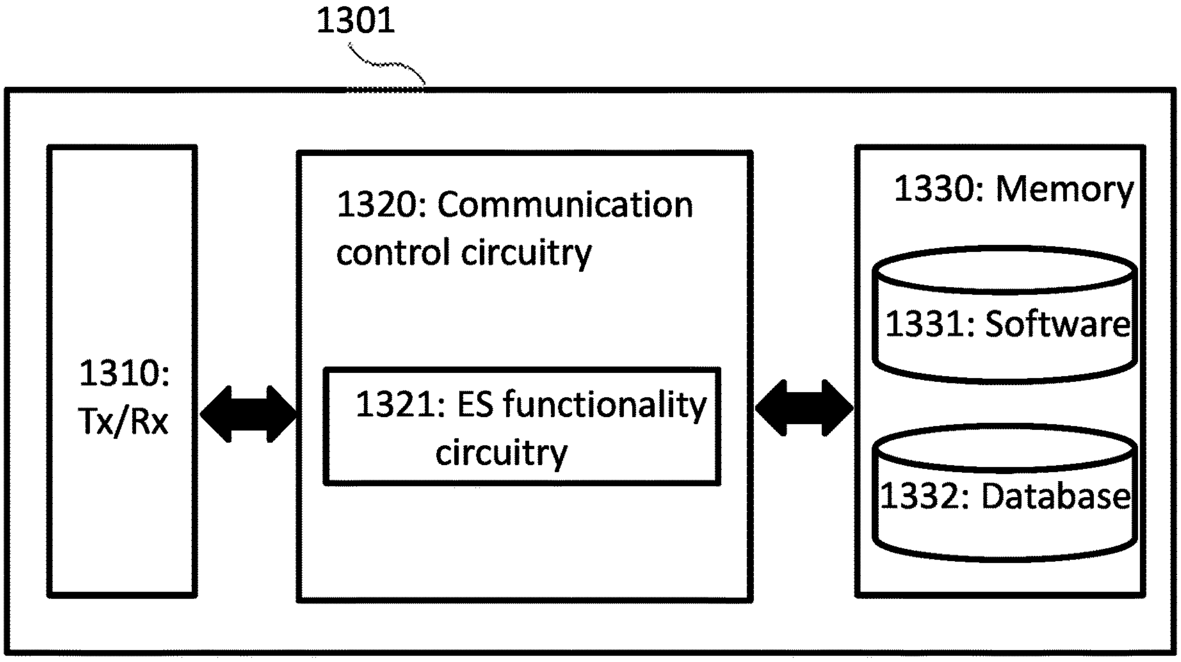
FIG. 13 illustrates an example embodiment of an apparatus.

FIG. 13 illustrates an example embodiment of an apparatus 1301, which may be an apparatus such as, or comprised in, an access node. The apparatus 1301 may correspond to the access node 104 of FIG. 1 such as (e/g)NodeB or any access node.

The apparatus 1301 may comprise one or more communication control circuitry 1320, such as at least one processor, and at least one memory 1330, including one or more algorithms 1331, such as a computer program code (software) wherein the at least one memory and the computer program code (software) are configured, with the at least one processor, to cause the apparatus to carry out any one of the example functionalities of the apparatus described above. Said at least one memory 1330 may also comprise at least one database 1332.

Referring to FIG. 13, the one or more communication control circuitry 1320 of the apparatus 1301 comprise at least energy saving functionalities circuitry 1321 which is configured to perform collecting data for training an artificial intelligence or machine learning model used in controlling the energy saving functionalities according to embodiments. To this end, the energy saving functionalities circuitry 1321 of the apparatus 1301 is configured to carry out at least some of the functionalities of the apparatus described above, e.g., by means of FIGS. 2 to 11, using one or more individual circuitries.

Referring to FIG. 12 and FIG. 13, the memory 1230, 1330 may be implemented using any suitable data storage technology, such as semiconductor-based memory devices, flash memory, magnetic memory devices and systems, optical memory devices and systems, fixed memory, and removable memory.

Referring to FIG. 12 and FIG. 13, the apparatus 1201, 1301 may further comprise different interfaces 1210, 1310 such as one or more communication interfaces (TX/RX) comprising hardware and/or software for realizing communication connectivity according to one or more communication protocols. The one or more communication interfaces 1210, 1310 may enable connecting to the Internet and/or to a core network of a wireless communications network. The one or more communication interface 1210, 1310 may provide the apparatus with communication capabilities to communicate in a cellular communication system and enable communication to different network nodes or elements. The one or more communication interfaces 1210, 1310 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

Figure 14:
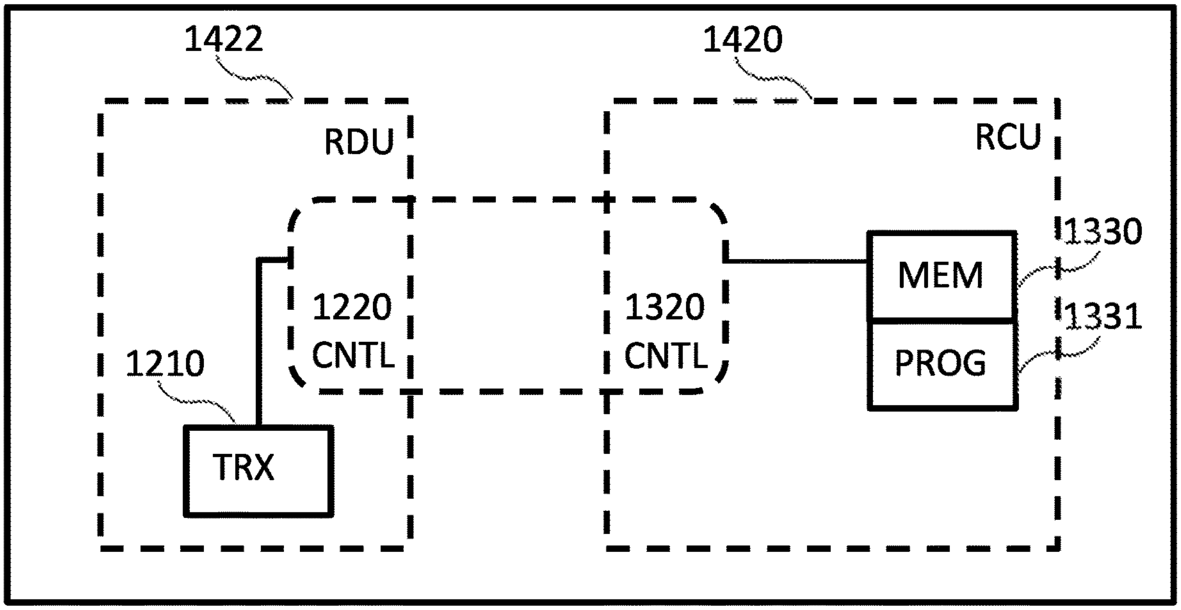
FIG. 14 illustrates an example embodiment of an apparatus.

In an embodiment, as shown in FIG. 14, at least some of the functionalities of the apparatus of FIG. 13 may be shared between two physically separate devices, forming one operational entity. Therefore, the apparatus may be seen to depict the operational entity comprising one or more physically separate devices for executing at least some of the described processes. Thus, the apparatus of FIG. 14, utilizing such shared architecture, may comprise a remote control unit RCU 1420, such as a host computer or a server computer, operatively coupled (e.g., via a wireless or wired network) to a remote distributed unit RDU 1422 located in the base station. In an embodiment, at least some of the described processes may be performed by the RCU 1420. In an embodiment, the execution of at least some of the described processes may be shared among the RDU 1422 and the RCU 1420.

Similar to FIG. 13, the apparatus of FIG. 14 may comprise one or more communication control circuitry (CNTL) 1320, such as at least one processor, and at least one memory (MEM) 1330, including one or more algorithms (PROG) 1331, such as a computer program code (software) wherein the at least one memory and the computer program code (software) are configured, with the at least one processor, to cause the apparatus to carry out any one of the exemplified functionalities of the apparatus described above.

In an embodiment, the RCU 1420 may generate a virtual network through which the RCU 1420 communicates with the RDU 1422. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

In an embodiment, at least some of the processes described in connection with FIGS. 2 to 11 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 11 or operations thereof.

According to an embodiment, there is provided an apparatus comprising means for receiving, from an access node, a configuration for neighbour cell measurements; receiving, from the access node, a message comprising information associated with a mode change in a first radio cell to an energy saving mode; receiving, in relation to the message, data collection configuration information for carrying out data collection measurements for training an artificial intelligence or machine learning model used in controlling the mode change; carrying out the data collection measurements and transmitting, to the access node, related results, wherein the data collection measurements are carried out according to the data collection configuration at least until a handover procedure associated with the mode change is started; carrying out the neighbour cell measurements and transmitting, to the access node, related results for the handover procedure; and carrying out, in response to receiving a handover command for the handover procedure associated with the mode change, a handover to a second radio cell.

According to an embodiment, there is provided an apparatus comprising means for determining and transmitting, at least to a plurality of apparatuses in a first radio cell, a configuration for neighbour cell measurements; determining, for a mode change in the first radio cell to an energy saving mode, a data collection configuration for carrying out data collection measurements for training an artificial intelligence or machine learning model used in controlling the mode change; transmitting, when the mode change in the first radio cell to the energy saving mode is initiated, to the plurality of apparatuses, a message comprising information associated with the mode change and, in relation to the message, data collection configuration information; receiving results related to the data collection measurements; receiving, from at least one of the plurality of apparatuses, results related to the neighbour cell measurements for a handover procedure associated with the mode change; and transmitting, to the at least one apparatus, a handover command to carry out a handover to a second radio cell.

Embodiments as described may also be carried out in the form of a computer process defined by a computer program or portions thereof. Embodiments of the methods described in connection with FIGS. 2 to 11 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

The term "non-transitory", as used herein, is a limitation of the medium itself (i.e., tangible, not a signal) as opposed to a limitation on data storage persistency (e.g., RAM vs. ROM).

Even though the embodiments have been described above with reference to examples according to the accompanying drawings, it is clear that the embodiments are not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:

at least one processor, and at least one memory including computer program code, the at least one memory and the computer program code being configured to, with the at least one processor, cause the apparatus at least to:

receive, from an access node, a configuration for neighbour cell measurements;

receive, from the access node, a message comprising information associated with a mode change in a first radio cell to an energy saving mode;

receive, in relation to the message, data collection configuration information for carrying out data collection measurements for training an artificial intelligence or machine learning model used in controlling the mode change;

carry out the data collection measurements and transmitting, to the access node, related results, wherein the data collection measurements are carried out according to the data collection configuration at least until a handover procedure associated with the mode change is started;

carry out the neighbour cell measurements and transmitting, to the access node, related results for the handover procedure, and carry out, in response to receiving a handover command for the handover procedure associated with the mode change, a handover to a second radio cell.

2. An apparatus according to claim 1, further comprising causing the apparatus to:

receive a first condition associated with the data collection configuration information;

check whether the first condition is met;

carry out, in response to the first condition being met, the data collection measurements and transmitting, to the access node, the related results, and ignore, in response to the first condition not being met, the data collection configuration information.

3. An apparatus according to claim 1, further comprising causing the apparatus to:

receive a second condition for starting the handover procedure associated with the mode change, wherein the second condition comprises at least one of: a time period to lapse after receiving the data collection configuration information, and a threshold for a difference between the best measured neighbor cell and the first radio cell when the first radio cell is the best cell, and start, in response to the second condition being fulfilled, the handover procedure associated with the mode change.

4. An apparatus according to claim 1, wherein the carrying out the data collection measurements further comprises causing the apparatus to:

associate the data collection measurements related results with additional information indicating that the results are data collected for training the artificial intelligence or machine learning model, and transmit, to the access node, the data collection measurements related results with the additional information associated.

5. An apparatus according to claim 1, further comprising causing the apparatus to:

continue carrying out the data collection measurements and transmitting the related results after the handover to the second radio cell has been carried out.

6. An apparatus according to claim 1, further comprising causing the apparatus to:

continue carrying out the data collection measurements and transmitting the related results after the handover to the second radio cell has been carried, and wherein the continuing is performed in response to an instruction to continue being associated with the data collection configuration information for carrying out the data collection measurements.

7. An apparatus comprising:

at least one processor; and at least one memory including computer program code;

the at least one memory and the computer program code being configured to, with the at least one processor, cause the apparatus at least to:

determine and transmitting, at least to a plurality of apparatuses in a first radio cell, a configuration for neighbour cell measurements;

determine, for a mode change in the first radio cell to an energy saving mode, a data collection configuration for carrying out data collection measurements for training an artificial intelligence or machine learning model used in controlling the mode change;

transmit, when the mode change in the first radio cell to the energy saving mode is initiated, to the plurality of apparatuses, a message comprising information associated with the mode change and, in relation to the message, data collection configuration information;

receive results related to the data collection measurements;

receive, from at least one of the plurality of apparatuses, results related to the neighbour cell measurements for a handover procedure associated with the mode change, and transmit, to the at least one apparatus, a handover command to carry out a handover to a second radio cell.

8. An apparatus according to claim 7, further comprising causing the apparatus to:determine a first condition associated with the data collection configuration information for configuring a subset of apparatuses with the data collection configuration, and transmit, to the plurality of apparatuses, the first condition with the data collection configuration information.

9. An apparatus according to claim 7, further comprising causing the apparatus to:

determine a first condition associated with the data collection configuration information for configuring a subset of apparatuses with the data collection configuration;

transmit, to the plurality of apparatuses, the first condition with the data collection configuration information, and, and activate the mode change in the first radio cell to an energy saving mode, when handover commands have been transmitted to the subset of apparatuses.

10. An apparatus according to claim 7, further comprising causing the apparatus to:

determine, for the handover procedure associated with the mode change, a second condition comprising at least one of: a time period to lapse after the data collection configuration information transmitted by the apparatus has been received, and/or a threshold for a difference between the best measured neighbor cell and the first radio cell when the first radio cell is the best cell, and transmit the second condition to the plurality of apparatuses.

11. An apparatus according to claim 7, further comprising causing the apparatus to transmit at least to an access node of the second radio cell a request to forward to the apparatus results related to the data collection measurements, and receive, from the access node of the second radio cell, the results related to the data collection measurements.

12. An apparatus according to claim 7, further comprising causing the apparatus to determine at least one of:

a number of radio link failures that occur after the mode change in the first radio cell to the energy saving mode is initiated;

a number of connection re-establishments that occur after the mode change in the first radio cell to the energy saving mode is initiated;

a number of handover preparation failures that occur after the mode change in the first radio cell to the energy saving mode is initiated;

a handover success rate after the mode change in the first radio cell to the energy saving mode is initiated; and/or a handover failure rate after the mode change in the first radio cell to the energy saving mode is initiated.

13. A method comprising:

receiving, from an access node, a configuration for neighbour cell measurements;

receiving, from the access node, a message comprising information associated with a mode change in a first radio cell to an energy saving mode;

receiving, in relation to the message, data collection configuration information for carrying out data collection measurements for training an artificial intelligence or machine learning model used in controlling the mode change;

carrying out the data collection measurements and transmitting, to the access node, related results, wherein the data collection measurements are carried out according to the data collection configuration at least until a handover procedure associated with the mode change is started;

carrying out the neighbour cell measurements and transmitting, to the access node, related results for the handover procedure; and carrying out, in response to receiving a handover command for the handover procedure associated with the mode change, a handover to a second radio cell.

14. A method comprising:

determining and transmitting, at least to a plurality of apparatuses in a first radio cell, a configuration for neighbour cell measurements;

determining, for a mode change in the first radio cell to an energy saving mode, a data collection configuration for carrying out data collection measurements for training an artificial intelligence or machine learning model used in controlling the mode change;

transmitting, when the mode change in the first radio cell to the energy saving mode is initiated, to the plurality of apparatuses, a message comprising information associated with the mode change and, in relation to the message, data collection configuration information;

receiving results related to the data collection measurements;

receiving, from at least one of the plurality of apparatuses, results related to the neighbour cell measurements for a handover procedure associated with the mode change; and transmitting, to the at least one apparatus, a handover command to carry out a handover to a second radio cell.

* * * * *